United States Patent [19]
Miura et al.

[11] Patent Number: 5,398,061
[45] Date of Patent: Mar. 14, 1995

[54] LIGHT SOURCE SWITCHING TYPE COLOR IMAGE SCANNER

[75] Inventors: Hisanori Miura; Tadakuni Narabu; Masahide Hirama, all of Kanagawa, Japan

[73] Assignee: Sony Corporation, Tokyo, Japan

[21] Appl. No.: 960,877

[22] Filed: Oct. 14, 1992

[30] Foreign Application Priority Data

Oct. 18, 1991 [JP] Japan .................................. 3-271124

[51] Int. Cl.⁶ .............................................. H04N 9/07
[52] U.S. Cl. ..................................... 348/269; 348/314
[58] Field of Search ...................... 358/213.19, 43, 44, 358/45, 213.23, 483, 213.26, 209; H04N 9/07; 348/266, 268, 269, 314, 324

[56] References Cited

U.S. PATENT DOCUMENTS

| | | | |
|---|---|---|---|
| 4,242,599 | 12/1980 | Suzuki | 358/213.19 |
| 4,255,760 | 3/1981 | Zeitzoff et al. | 358/43 |
| 4,658,303 | 4/1987 | Nagano | 358/483 |
| 4,689,808 | 8/1987 | Moorman et al. | 358/213.26 |
| 4,731,661 | 3/1988 | Nagano | 358/509 |
| 5,105,264 | 4/1992 | Erhardt | 358/213.19 |
| 5,166,811 | 11/1992 | Nagano | 358/213.26 |

*Primary Examiner*—Joseph Mancuso
*Assistant Examiner*—Wendy R. Greening
*Attorney, Agent, or Firm*—Hill, Steadman & Simpson

[57] ABSTRACT

The present invention is directed to a light source switching type color image scanner in which a color signal can be read out at high speed by reducing a read-out time. A red light source (3), a green light source (4) and a blue light source (5) which can be selectively switched are disposed under an original document holder (1) on which an original document (2) is held. Further, there are disposed a mirror (7) and a lens (8) which are used to focus a reflected image of the original document (2) onto a CCD linear image sensor (6). The CCD linear image sensor (6) includes a shutter gate (12) and a shutter drain (13) which are used to reset signal charges of remaining lights from the respective light sources (3), (4) and (5). The reset of a signal charge begins before a next color light source is energized.

6 Claims, 5 Drawing Sheets

LIGHT SOURCE SWITCHING TYPE COLOR IMAGE SCANNER

BACKGROUND OF THE INVENTION

1. Field of the Invention

The present invention relates to a light source stitching type color image scanning apparatus such as a color image scanner or the like which can read out a color original document.

2. Description of the Prior Art

As conventional apparatus of this type, there is known a line sequential color image scanner which is illustrated in FIG. 1 of the accompanying drawings, for example.

As shown in FIG. 1, a red light source 22, a green light source 23 and a blue light source 24 are disposed under an original document holder 21 made of a transparent glass on which an original document 20 is held. Under the red, green and blue light sources 22, 23 and 24, there are disposed an optical system composed of a mirror 25 and a lens 26 and a CCD (charge-coupled device) linear image sensor 27. This CCD linear image sensor comprises a sensor section formed of an array of a plurality of sensing elements, a read-out gate, a transfer register of CCD structure and an output section connected to the final stage of the transfer register, though not shown.

When a color image is read out by this conventional color image scanner, the red light source 22, the green light source 23 and the blue light source 24 are sequentially energized and reflected lights corresponding to the above respective colors reflected on the original document 20 are introduced into the CCD linear image sensor 27. Then, the CCD linear image sensor 27 operates to sequentially read out the original document 20 at every line on the basis of image signals of respective colors.

A read-out operation is carried out as shown in FIG. 2 of the accompanying drawings.

As shown in FIG. 2, the red light source 22, for example, is energized and a red signal charge is stored in the sensor section. Then, a read-out pulse P1 is applied to the read-out gate to transfer the signal charge to the transfer register. The signal charge is transferred throughout the transfer register by a transfer clock $\phi_H$ to thereby output a red signal from the output section. Then, a remaining signal charge read-out pulse $P_2$ that is used to read out a remaining red signal charge is applied to the read-out gate to transfer the remaining signal charge to the transfer register. Then, the signal charge of the remaining light is discharged by the transfer clock pulse $\phi_H$. The green and blue signals will be read out and discharged similarly.

However, according the above example of the prior art, the color image could not be read out at high speed due to the reasons which follow.

That is, in the CCD linear image sensor 27 used in the conventional CCD solid state image sensing devices, the respective light sources 22, 23 and 24 are energized to introduce reflected lights of the original document 20 into the CCD linear image sensor 27, whereby a signal charge is stored in the sensor section. The signal charge thus stored is read out to the transfer register. In this case, as shown by arrows A, B and C in FIG. 2, even after the signal charges are read out, lights are still remaining in the respective light sources 22, 23 and 24 and stored as signal charges. These signal charges must be read out again and then discharged. Therefore, according to the example of the conventional apparatus, when one color signal is read out, a read-out time which results from adding a real signal transfer time and a transfer time of remaining signal charges is needed so that the color image cannot be read out at high speed.

OBJECTS AND SUMMARY OF THE INVENTION

Therefore, it is an object of the present invention to provide an improved light source switching type color image scanner in which the aforesaid shortcomings and disadvantages encountered with the prior art can be eliminated.

More specifically, it is an object of the present invention to provide a light source switching type color image scanner in which a read-out time can be reduced.

It is another object of the present invention to provide a light source switching type color image scanner which can be operated at high speed.

According to an aspect of the present invention, there is provided a color image scanner having light sources of a plurality of colors which are rendered luminous in different colors and a color CCD (charge-coupled device) linear image sensor wherein the light sources of a plurality of colors are switched and an original document is read out by the color CCD linear image sensor. This color CCD linear image sensor comprises a sensor section composed of an array of a plurality of sensing elements, a charge transfer section disposed on one side of the sensor section for reading out a signal charge of the sensor section through a read-out gate and transferring the signal charge thus read out, and a shutter drain disposed on the other side of the sensor section for discharging a signal charge of a remaining light in the sensor section through a shutter gate, wherein the signal charge of remaining light is discharged through the shutter gate to the shutter drain when the light sources of a plurality of colors.

The above and other objects, features, and advantages of the present invention will become apparent from the following detailed description of an illustrative embodiment thereof to be read in conjunction with the accompanying drawings.

DETAILED DESCRIPTION OF THE PREFERRED EMBODIMENT

A light source switching type color image scanner according to an embodiment of the present invention will hereinafter be described with reference to the drawings.

Figure 1:
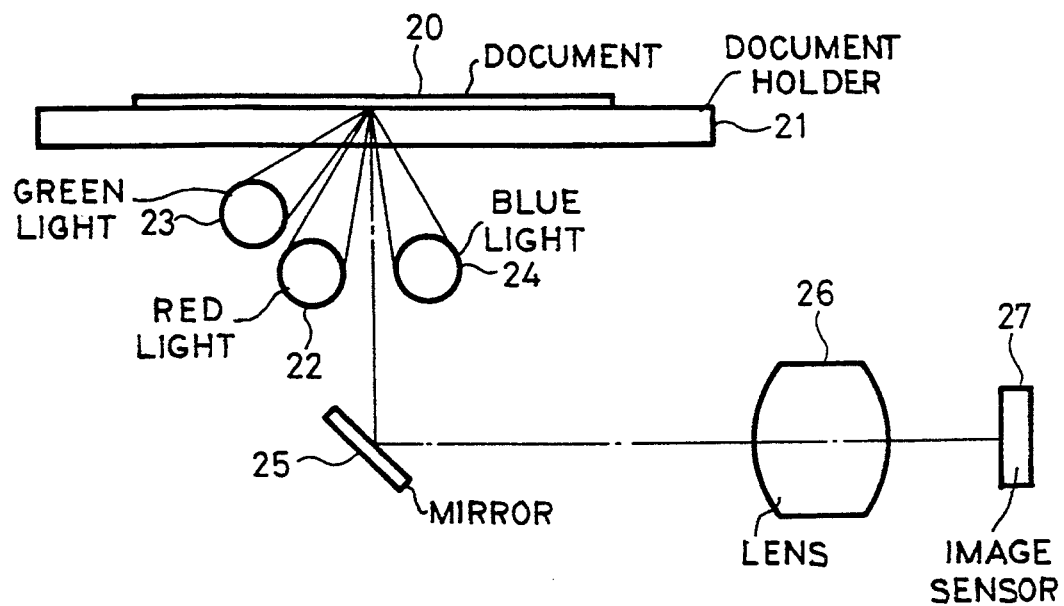
FIG. 1 is a schematic diagram showing an overall structure of a line sequential color image scanner according to an example of the prior art.
Figure 2:
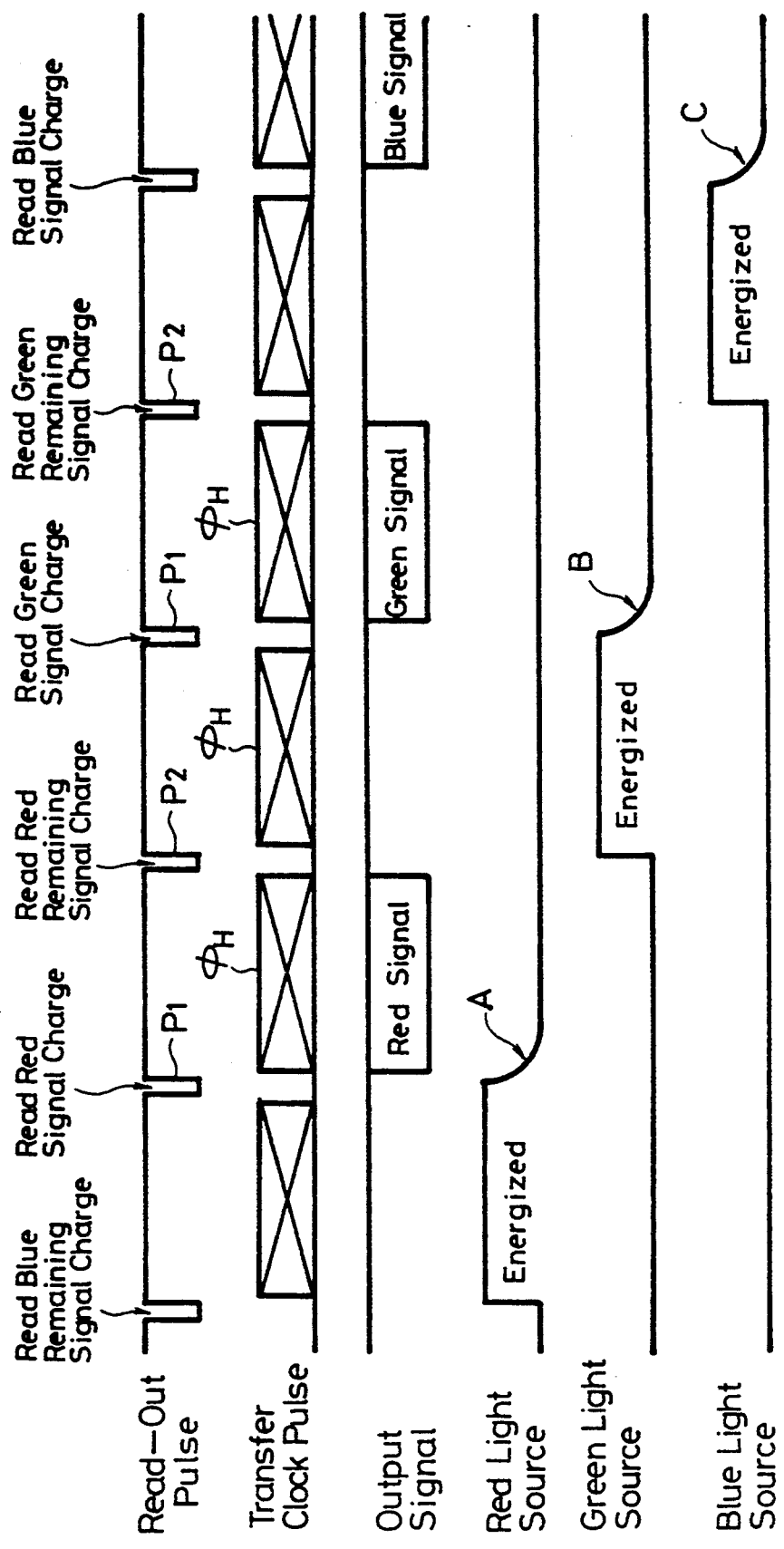
FIG. 2 is a diagram of a timing chart showing a read-out operation of the conventional line sequential color image scanner shown in FIG. 1.
Figure 3A:
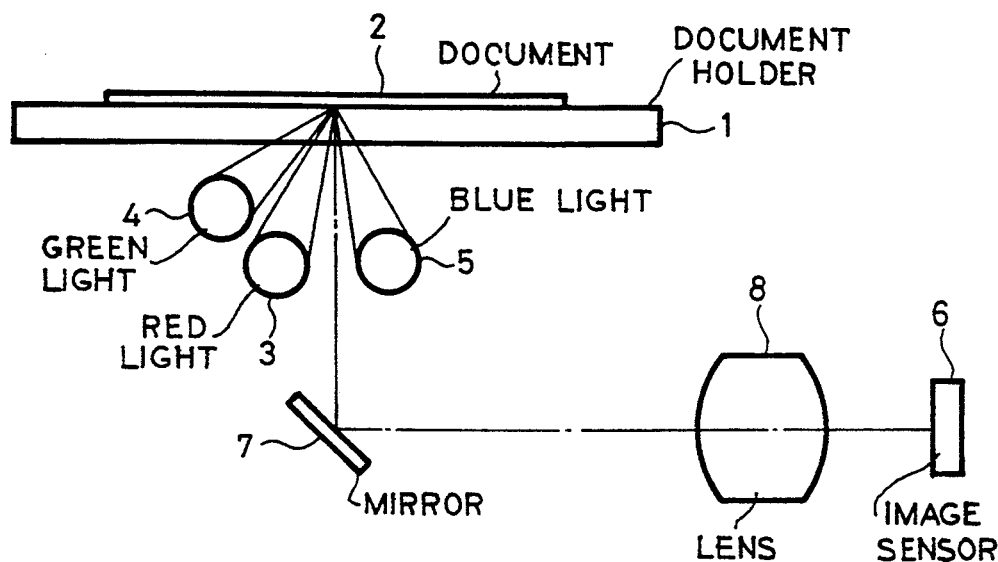
FIG. 3A is a schematic diagram showing an overall structure of a light source switching type color image scanner according to an embodiment of the present invention.

FIG. 3A of the accompanying drawings shows in a schematic fashion a structure of the light source switching type color image scanner according to the embodiment of the present invention.

As shown in FIG. 3A, the light source switching scanner according to this embodiment includes an original document holder 1 made of a transparent glass plate. An original document 2 to be scanned is set on this original document holder 1.

Under the original document holder 1, there are respectively disposed a red light source 3, a green light source 4 and a blue light source 5, each of which is formed of a fluorescent lamp to illuminate the original document 2. The light sources 3, 4 and 5 are respectively switched and energized solely. A mirror 7, which is used to introduce a reflected light from the original document 2 into a CCD linear image sensor 6, is disposed under the red, green and blue light sources 3, 4 and 5. Further, an image formation lens 8 is disposed between the mirror 7 and the CCD linear image sensor 6. The CCD linear image sensor 6 is of the black and white linear image sensor and includes a shutter as will be described later on. The respective light sources 3, 4, 5, the mirror 7 and the lens 8 constitute an optical system which is moved at a constant speed to thereby introduce a reflected light image of the original document 2 onto the CCD linear image sensor 6.

Figure 3B:
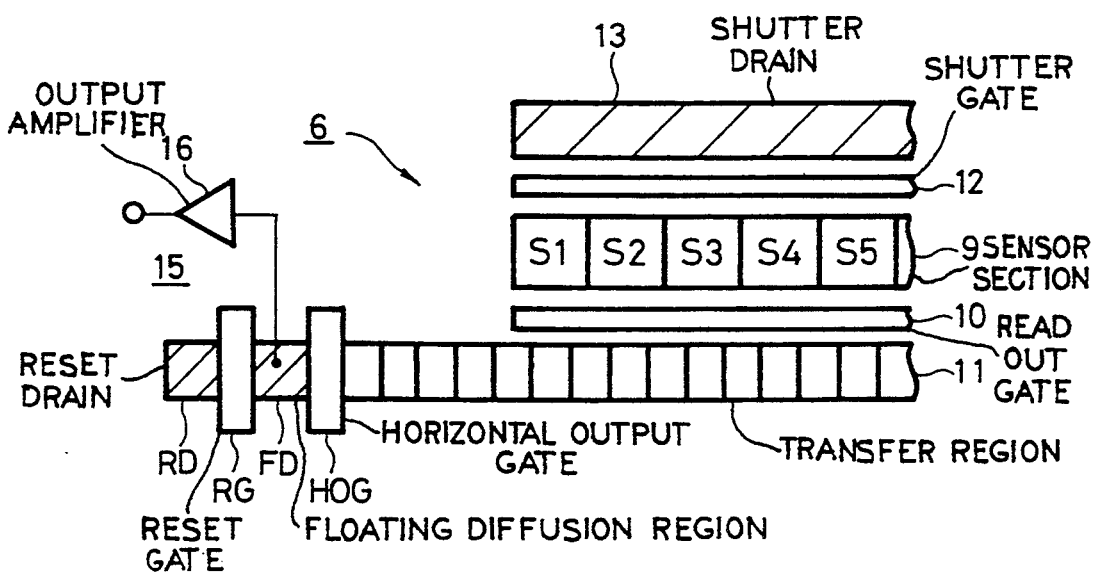
FIG. 3B is a schematic diagram showing a main portion of a CCD linear image sensor used in the embodiment of the present invention.

FIG. 3B of the accompanying drawings shows a main portion of the CCD linear image sensor 6.

As shown in FIG. 3B, a transfer register 11 of a CCD structure is disposed on one side of a sensor section 9 composed of an array of a plurality of sensing elements $S_1$, $S_2$, $S_3$, $S_4$, $S_5$ through a read-out gate 10. An output section 15 provided at the final stage of the transfer register 11 operates to derive an output signal.

The output section 15 comprises a horizontal output gate HOG, a floating diffusion region FD, a reset gate RG, a reset drain RD and an output amplifier 16 connected to the floating diffusion region FD. A signal charge in the transfer register 11 is transferred through the horizontal read-out gate HOG to the floating diffusion region FD, in which it is converted in the form of signal charge to signal voltage and then output through the output amplifier 16. Ths signal charge in the floating diffusion region FD is discharged to the reset drain RD through the reset gate RG.

A shutter drain 13 that is used to reset the signal charge is disposed on the other side of the sensor section 9 through a shutter gate 12. The shutter drain 13 serves also as an overflow drain and the shutter gate 12 can be served also as an overflow control gate.

Read-out operation of the light source switching type color image scanner according to the embodiment of the present invention will be described below.

Figure 4:
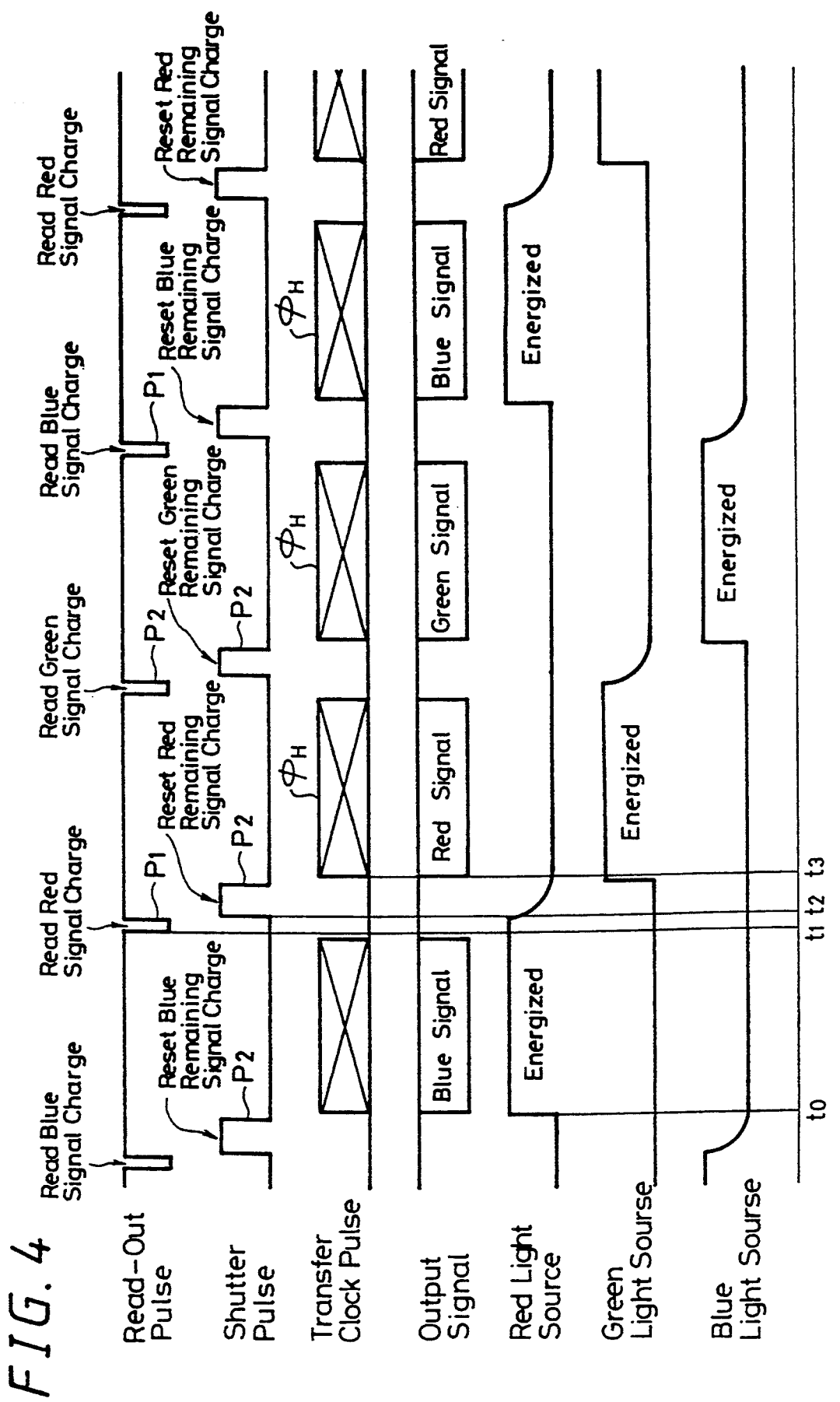
FIG. 4 is a diagram of a timing chart showing a read-out operation of the light source switching type color image sensor according to the embodiment of the present invention.
Figure 5:
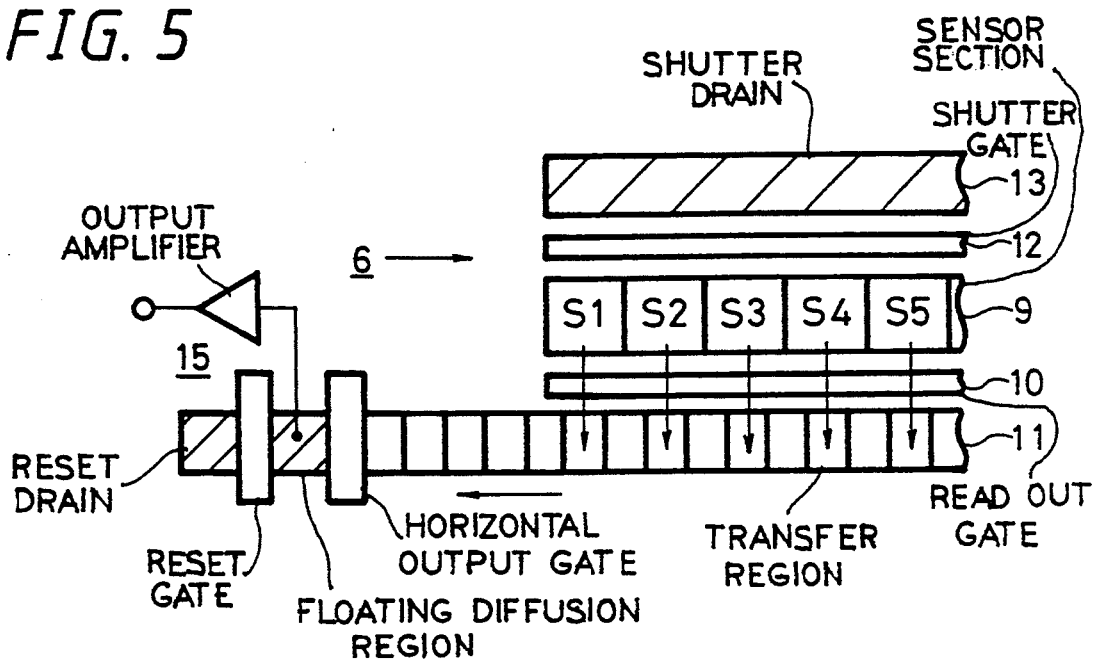
FIG. 5 is a diagram used to explain a flow of a signal charge when a read-gate is turned on according to the embodiment of the present invention.
Figure 6:
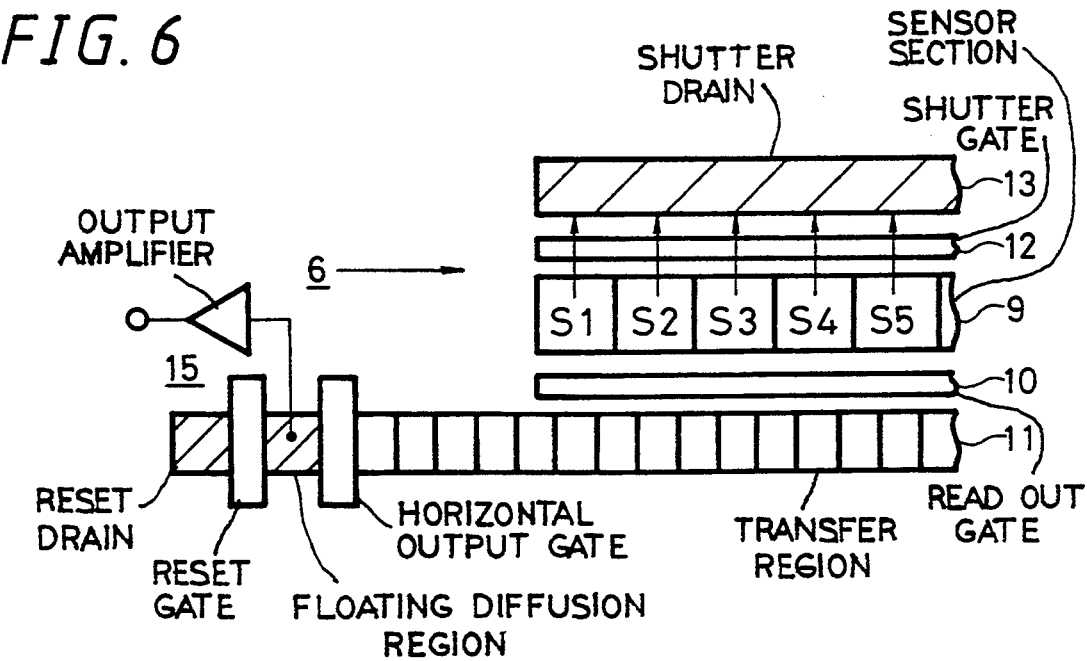
FIG. 6 is a diagram used explain a flow of a signal charge when a shutter is operated according to the embodiment of the present invention.

As shown in FIG. 4 of the accompanying drawings, the red light source 3 is energized at a time $t_0$ to store a red Signal charge in the sensor section 9. Then, at the next time $t_1$, the read-out pulse $P_1$ is generated to turn on the read-out gate 10 and as shown in FIG. 5 of the accompanying drawings, the red signal charge in the sensor section 9 is transferred to the transfer register 11. Further, at the next time $t_2$, a shutter pulse $P_2$ is generated to turn on the shutter gate 12, whereby a remaining signal charge of the red light source 3 is transferred to the shutter drain 13 as shown in FIG. 6. Thus, the signal charge of the remaining light amount is reset.

At the next time $t_3$, the transfer clock pulse $\phi_H$ is generated to cause the outputs section 15 at the final stage of the transfer register 11 to output the red signal.

On the other hand, during at least the red signal is output just before the time $t_3$, the green light source 4 is energized to store a green signal charge in the sensor section 9. Thereafter, similarly to the case of the red light source 3, the read-out of the reflected lights of the green and blue light sources 4 and 5 are read out and the charges of the remaining lights thereof are reset sequentially, whereby the color signal of one line is read out on the basis of the red, green and blue output signals. Then, the above optical system is moved and the above operation is repeated to thereby read the original document 2.

As described above, according to the above-mentioned embodiment of the present invention, since the signal charges of the remaining lights of the respective red, green and blue light sources 3, 4 and 5 are reset by the shutter drain 13 of the CCD linear image sensor 6, the transfer register 11 need not be operated in order to discharge such signal charges of the remaining lights. Consequently, the read-out time can be reduced about 50% at maximum so that the color image can be read out at high speed.

While the red, green and blue light sources are employed as described above, the present invention is not limited thereto and may use light sources of other colors.

Further, while the CCD linear image sensor is used as the detecting means as described above, the present invention is not limited thereto and may use a CCD area sensor, for example.

Furthermore, the present invention is not limited to the light source switching type color image scanner in which the original document is read by moving the optical system and may be applied to a color image scanner of an original document moving type.

As described above, since the detecting means includes a shutter which resets a signal charge of a remaining light of a light source, the transfer register need not be operated in order to discharge the signal charge of the remaining light. As a consequence, the read-out time can be reduced and the color image can be read out at high speed.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A color image reading apparatus for reading a color document, comprising:
   a plurality of light sources for emitting light of respective different colors onto the document;
   a CCD sensor for receiving a light reflected from the document and for reading out an image of the document, said CCD sensor comprising a sensor section including an array of a plurality of sensor elements, a charge transfer section disposed on one side of the sensor section for reading out signal charges from the sensor section through a read-out gate, a shutter drain disposed on another side of the sensor section for discharging signal charges generated by a remaining light left after emission of the respective light sources through a shutter gate; and means for providing shutter pulses to the shutter gate so that each of the shutter pulses rises substantially while turning off the corresponding light source.

2. A color image reading apparatus as claimed in claim 1, further comprising means for sequentially transmitting the respective emitted light onto the documents.

3. A color image reading apparatus as claimed in claim 1, further comprising means for providing each said shutter pulse after providing a read-out pulse of corresponding color to the read-out gate.

4. A color image reading apparatus as claimed in claim 1, wherein said CCD sensor includes a floating diffusion region provided in an output section of the charge transfer section through a horizontal read-out gate.

5. A color image reading apparatus as claimed in claim 1, wherein said shutter drain serves as an overflow drain region and said shutter gate serves as an overflow control gate.

6. A color image reading apparatus as claimed in claim 1, wherein said light sources comprise red, green and blue light sources.

* * * * *